Nov. 3, 1953  J. K. JACOBUS  2,658,119
TIRE AIR INDICATOR APPARATUS
Filed Jan. 7, 1950  2 Sheets-Sheet 1
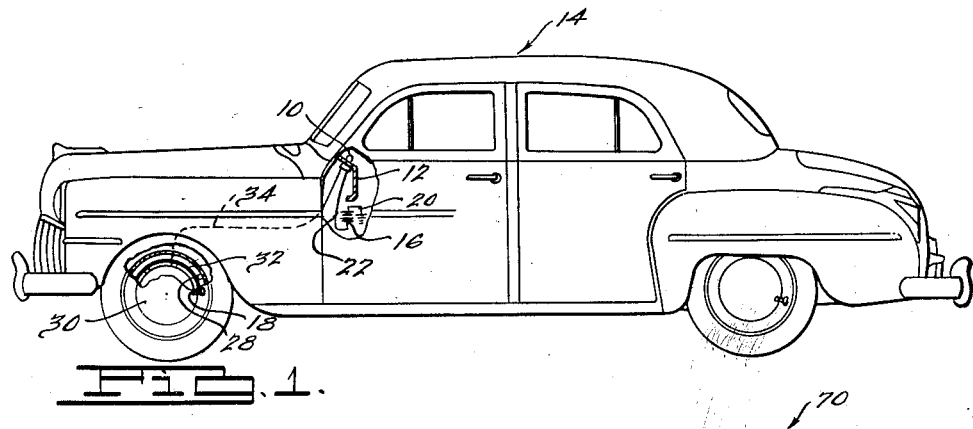
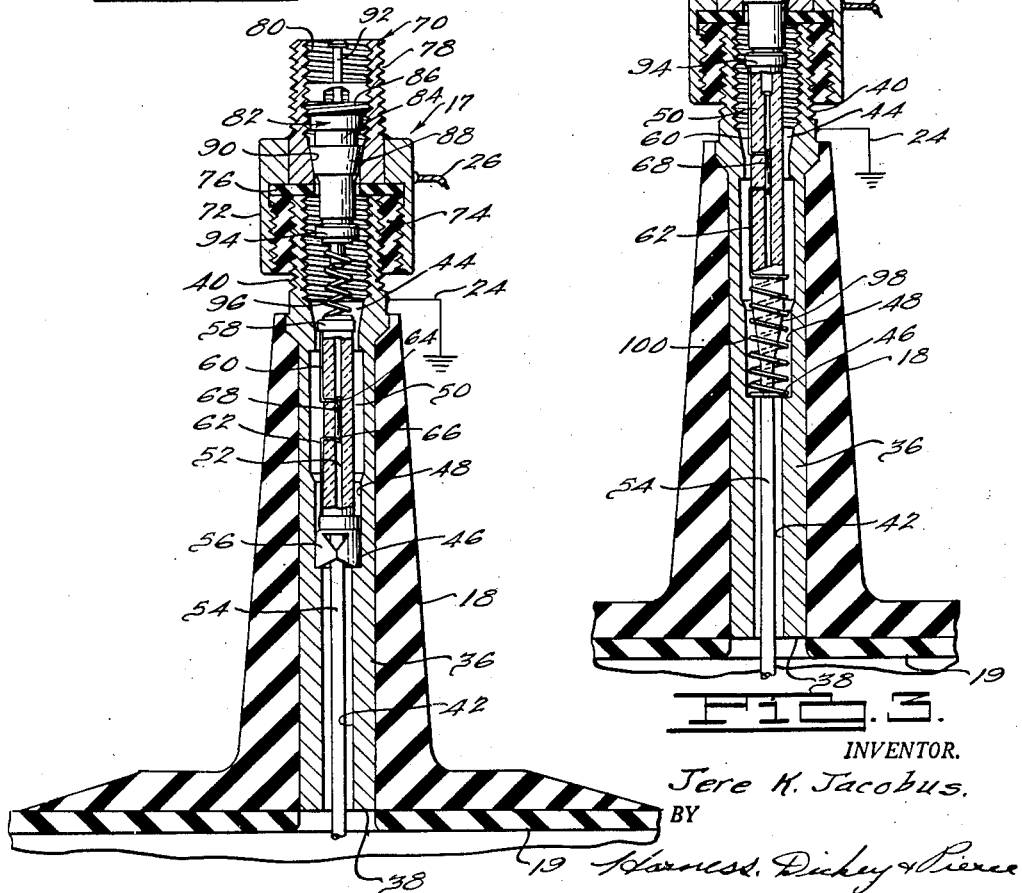
INVENTOR.
Jere K. Jacobus,
BY
Harness, Dickey & Pierce
ATTORNEYS.

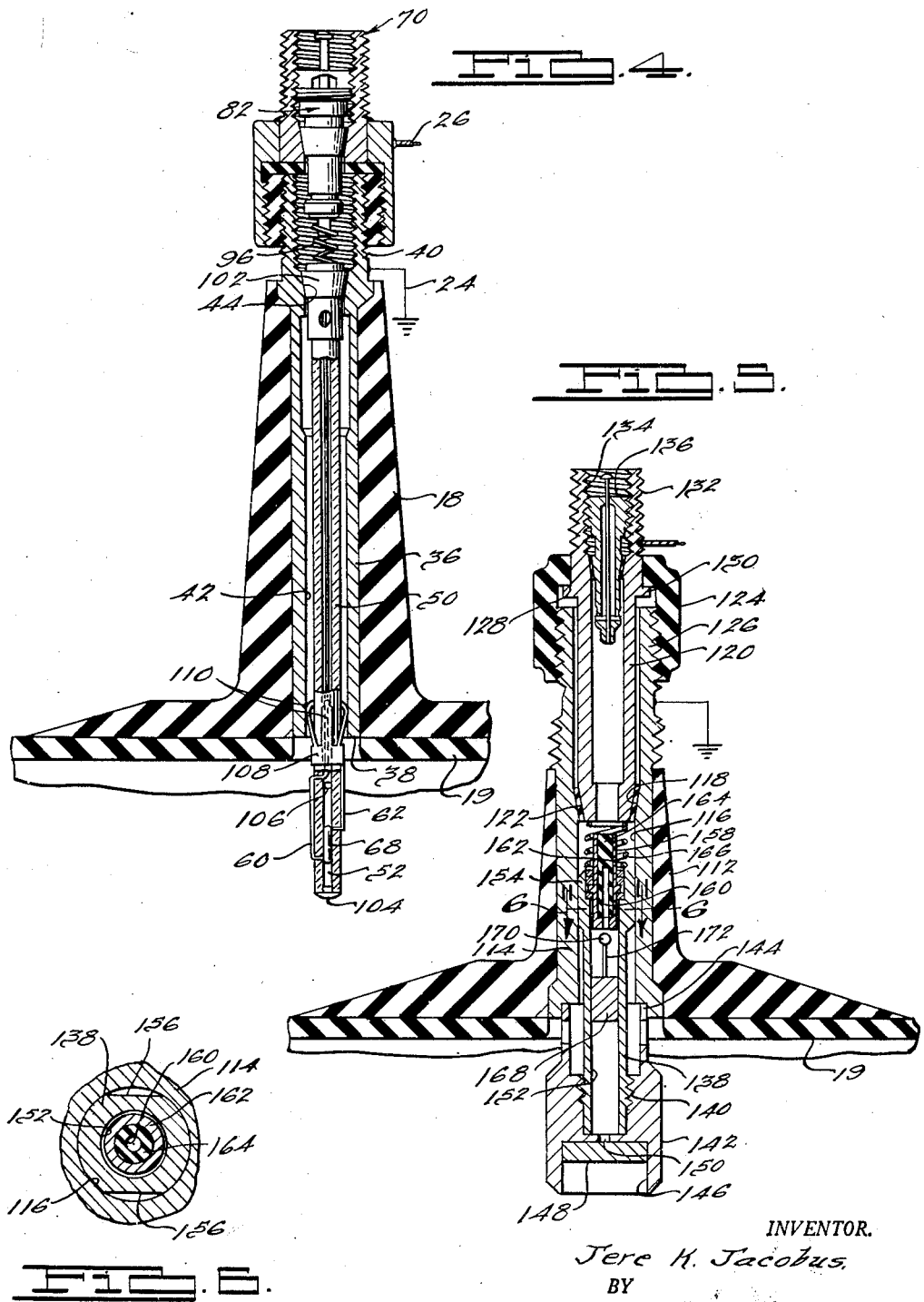

Patented Nov. 3, 1953

2,658,119

UNITED STATES PATENT OFFICE 2,658,119

TIRE AIR INDICATOR APPARATUS

Jeré K. Jacobus, Port Huron, Mich.

Application January 7, 1950, Serial No. 137,373

19 Claims. (Cl. 200—61.25)

1

The present invention relates to an improved indicator apparatus which may be responsive either to changes in the gas pressure of, or excessive loss of gas from, a normally closed chamber, and more particularly to an improved tire air indicator apparatus.

It is an object of the present invention to provide an improved indicator apparatus of the above mentioned type which may be economically manufactured, readily installed and which is reliable and efficient in operation.

A further object of the invention is to provide an apparatus of the above mentioned type, including signal means for indicating variations of the gas pressure in either direction from a predetermined range and including an improved circuit controlling means controlling the actuating of the signal means.

Another object of the invention is to provide an indicator apparatus of the above mentioned type in which changes in the gas pressure within the chamber, which result from changes in the temperature of the gas within the chamber, will not affect the indicator apparatus.

It is an important object of the present invention to provide an improved circuit control mechanism for an indicator apparatus of the above mentioned type, adapted for use and to be readily installed in conventional pneumatic tire tube valve stems.

It is also an object of the present invention to provide an improved apparatus of the just mentioned type adapted to be installed in a conventional valve stem and permit filling of the tire tube through the valve stem and which serves as a gage indicating when the tire tube has been filled to the desired pressure.

A further object of the invention is to provide an improved indicator apparatus particularly adapted for use in the valve stems of pneumatic tires, such as truck tires, which are subject to overheating in normal use and which includes improved circuit controlling means adapted to be disposed out of heat transfer relation with the truck tires so that the apparatus will indicate excessive increases in pressure within the truck tire tube resulting from excessive heating of the gases therein.

Other and more detailed objects of the invention will become apparent from a consideration of the folowing specification, the appended claims and the accompanying drawings, wherein:

Figure 1 is a broken view of an automobile illustrating, somewhat diagrammatically, an embodiment of the present invention installed on the automobile;

2

Fig. 2 is a transverse longitudinal sectional view on a greatly enlarged scale of the valve stem and associated mechanism, illustrated in Figure 1;

Figs. 3, 4 and 5 are transverse longitudinal sectional views similar to Figure 2, showing modified forms of the invention; and, Fig. 6 is a broken sectional view of the structure illustrated in Figure 5, taken along the line 6—6 thereof.

It will be appreciated from a complete understanding of the present invention that the improvements thereof may be readily incorporated in indicator apparatuses of various types and adapted for a wide variety of uses. The applicant's improved indicator apparatus has particular utility as an indicator apparatus for use in connection with the pneumatic tires and accordingly, in an illustrative, but not a limiting sense, the present invention is herein illustrated and described as embodied in a pneumatic tire air indicator apparatus.

Referring to Figures 1 and 2, the apparatus generally comprises a visual signal indicator which for illustrative purposes is shown in the form of a lamp bulb 10 mounted on the instrument panel 12 of an automobile indicated at 14, a suitable source of electrical power, which may be the conventional automobile battery indicated at 16, circuit control means 17 mounted on the valve stem 18 of the tire tube 19, and means providing an electrical circuit connecting the control means 17 in series with the bulb 10 and the battery 16. Figure 1 illustrates only the indicator apparatus for the left front wheel of the vehicle 14. It will be appreciated, however, that this apparatus may be duplicated for each of the other wheels or that if desired, a single bulb 10 may be used for all wheels and the circuit control means 17 at all of the wheels may be connected in series so that each of these means 17 must remain closed to maintain the bulb 10 lighted. In the illustrated construction, one side of the battery is grounded in a conventional manner as indicated at 20 and one lead 22 from the filament of the bulb 10 is connected to the other side of the battery 16. The circuit through the light bulb 10 and the circuit controlling means 17 is completed by grounding one lead 24 of the control means 17 and connecting the other lead 26 in a conventional manner through a stationary brush indicated at 28, a collector ring 32 on the wheel 30 and engaged by the brush 28, and a line 34 connecting the collector ring 32 to the other end of the filament of the bulb 10.

Referring to Figure 2, in the applicant's preferred embodiment there illustrated, the valve stem 18 is of conventional construction and includes a metal sleeve member 36 which communicates, at its inner end 38, with the interior of the tire tube 19 and the outer end portion of which is externally threaded as indicated at 40. The sleeve member 36 has a passage 42 extending longitudinally therethrough which, in accordance with conventional design, includes a conical valve seat portion 44 spaced inwardly of its outer end and an outwardly facing annular shoulder 46 intermediate the valve seat 44 and the inner end 38, and between the shoulder 46 and the seat 44, the sleeve member 36 defines an enlarged longitudinally extending chamber 48.

The signal circuit controlling means generally indicated at 17 comprises a tubular member 50, which in the preferred embodiment illustrated in Figure 2, is formed of glass, and which is disposed within the enlarged chamber 48 in the sleeve member 36. The tubular member 50 has a cylindrical bore 52 formed therein and closed at its outer or upper end as viewed in Figure 2. The lower end of the bore 52 is open and is connected to a suitable tube 54 extending through the passage 42, beyond the end 38 of the sleeve member 36 and into the tire tube 19. The tube 54 is substantially smaller than the passage 42 and the tube member 50 is substantially smaller than the enlarged portion 48 in order to permit passage of air through the passage 42 and the enlarged portion 48 around the tubular member 50 and the tube 54 during inflating of the tire tube 19. The tube member 50 is supported on the outwardly facing shoulder 46 by a conventional metal bifurcated fitting 56, also adapted to readily permit the passage of air during inflation of the tube 19.

A metal cap 58 is secured on the outer or upper end of the tubular member 50 and a pair of wires 60 and 62 are mounted on the tubular member 50 and connected respectively to the cap 58 and the fitting 56. The wires 60 and 62 extend along the outer surface of the tubular member 50 and terminate in contact portions 64 and 66 which extend transversely of the tubular member 50 and into the cylindrical bore 52 thereof. These contacts 64 and 66 are disposed in spaced relation to the closed upper end of the bore 52 and are spaced longitudinally of the bore 52 relative to each other. A short column of mercury 68, of a length slightly greater than the distance between the contacts 64 and 66, is disposed in the bore 52 and is freely movable longitudinally thereof in response to a balancing of the air pressures within the bore at the opposite ends of the mercury 68.

A second metal sleeve member 70, disposed coaxially of and forming an extension of the valve stem sleeve member 36, has an internally threaded nut portion 72 by means of which it is secured on the threaded outer end 40 of the sleeve member 36 through an intermediate insulating material 74. The nut portion 72 also carries an insulating disk 76 providing insulation between the outer end of the sleeve member 36 and adjacent portion of the outer sleeve member 70. The outer sleeve member 70 is externally threaded adjacent its outer end as indicated at 78 for threaded engagement with a suitable valve cap (not shown) and is internally threaded as indicated at 80 for threaded engagement with a valve core 82. The valve core 82 is of conventional construction including a fixed body portion 84 having an externally threaded portion 86 which engages the internally threaded portion 80 of the outer sleeve member 70 and which has a conical portion 88 seated on a conical valve seat 90 formed in the outer sleeve 70. The valve core 82 also includes a conventional pin 92 which carries at its inner end an annular valve portion 94 which seats against the inner end of the stationary housing 84. A coil spring 96 is disposed with its upper end against the lower surface of the movable valve member 94 carried on the valve pin 92 and with its lower end seating on the upper or outer surface of the cap 58 on the tubular member 50. This spring 96 functions both to hold the tubular member 50 in place, with the fitting 56 engaging the shoulder 46, and to provide an electrical conductor connecting the cap 58 to the valve 82.

It will now be appreciated that the above mentioned line 24, one end of which is grounded, is connected to the contact 66 through the sleeve member 36, the fitting 56 and the wire 62. It will also be appreciated that the line 26, one end of which is connected to one side of the battery 16, is connected to the contact 64 through the outer sleeve member 70, the valve 82, the spring 96, the cap 58 and the wire 60.

In the applicant's preferred embodiment, the tubular member 50 is calibrated so that upon inflation of the tube 19 to a desired minimum pressure, for example, 26 pounds per square inch, the column of mercury 68 moves upwardly as viewed in Figure 2 to compress the air in the closed end portion of the bore 52 and to a position in which it interconnects the contacts 64 and 66, and so that upon continued inflation of the tube 19 beyond a desired maximum pressure, for example, 30 pounds per square inch, the mercury 68 moves upwardly beyond the position illustrated in Figure 2 to move the lower end of the mercury 68 out of contact with the contact 66, thereby breaking the circuit through the mercury 68, between the contacts 64 and 66. It will be noted that in the construction as above described, the contacts 64 and 66 are interconnected and accordingly, the signal lamp 10 is lighted at all times when the pressure within the tube 19 is within the desired pressure range. By virtue of this construction the operator of the vehicle knows that when the signal light 10 is off, it indicates that the pressure is above or below the desired pressure range, or that there has been a break in the signal circuit, such for example, as by the burning out of the bulb 10. This construction eliminates the possibility that such a burning out of the bulb 10 or other failure in the signal circuit might take place without the knowledge of the operator of the vehicle.

It is an important feature of the present invention that by virtue of the location of the tubular member 50 in the sleeve member 36 in the valve stem 18, it is substantially out of heat transfer relationship with the tube 19 and accordingly, the air in the closed outer end of the bore 52 is virtually unaffected by changes in temperature of the tube 19 and the air therein. Accordingly, excessive overheating of the tube 19 resulting in excessive increases of the air pressure within the tube 19 will be indicated by the mercury 68 moving upwardly out of contact with the contact 66, resulting in the bulb 10 going off. This feature has particular importance in relation to truck tire installations where overheating in use frequently occurs.

Referring to Figure 3, the embodiment there illustrated is generally similar to the above described embodiment illustrated in Figure 2, but differs therefrom in that the tubular member 50 is formed of latex rubber or other suitable flexible material and is directly connected to the movable valve element 94 of the valve 82. Also, in the embodiment illustrated in Figure 3, the tube 54 is integrally connected to the tubular member 50 through a tapering portion indicated at 98. A coil spring 100 has its upper end secured to the tubular member 50 at the tapering portion 98 and its lower end seated on the annular shoulder 46 of the sleeve member 36. The upper end of the spring 100 is also connected to the wire 62 so that the spring 100 serves to connect the wire 62 to the valve sleeve member 36. It will be appreciated that the embodiment illustrated in Figure 3 has the important advantage that it may be more economically manufactured than the embodiment illustrated in Figure 2, although the earlier described construction may be manufactured with slightly greater accuracy.

The embodiment illustrated in Figure 4 differs from both of the embodiments illustrated in Figures 2 and 3 in that it requires a slight modification of the valve stem 18, namely, the boring out of the passage 42 so that it is at all points at least equal in diameter to the diameter of the enlarged portion indicated at 48 in Figures 2 and 3. In the embodiment illustrated in Figure 4, the tubular member 50 is greatly elongated and carries a fitting 102 at its upper end which seats in the conical seat 42 of the sleeve member 36 and is adapted to permit passage of air therethrough during inflation of the tube 19. Also, in the embodiment illustrated in Figure 4, the tubular member 50 extends downwardly into the tube 19 and the lower end of the tube 50 is closed as indicated at 104. In this embodiment the bore 52 of the tubular member 50 communicates directly with the interior of the tube 19 through an aperture 106 opening laterally through the tubular member 50. The wire 60 extends along the outside of the tubular member 50 to a point above the aperture 106 at which it turns into the bore 52 and extends upwardly therethrough to the upper end thereof where it is connected through the fitting 102 to the spring 96. The wire 62 extends along the outside of the tubular member 50 to a point above the point where the wire 60 turns into the bore 52 and is connected to a collar 108 fitted on the member 50 and having a plurality of spring fingers 110 engaging the sleeve member 36 to support the tubular member 50 centrally of the bore 52. The collar 108, through the spring fingers 110, also serves to connect the wire 62 to the sleeve member 36. The construction illustrated in Figure 4 is particularly adapted for use in passenger vehicles or light trucks where the problem of increase in pressure within the tube resulting from heating of the tire during use is not serious. It will be appreciated that in this construction any heating of the air within the tube 19 will also result in a similar heating of the air at the closed lower end of the bore 52 below the mercury 68, with the net result that the increase in temperatures of the air within the tube 19 will have no affect upon the position of the mercury 68.

Figure 5 shows a modified form of the present invention illustrated in connection with a conventional air and water type valve of the type commonly used on tractor tires. In the construction there illustrated, the valve stem 112 has a metal sleeve 114 having a relatively large bore 116 therethrough and including a conical seat 118. An outer sleeve 120, disposed in coaxial relationship with the sleeve 114, carries an insulating band 122 which seats on the seat 118 and the outer sleeve 120 is secured to the sleeve 114 by means of a nut 124 formed of suitable insulating material and engaging the threaded outer end portion 126 of the sleeve member 114. The nut 124 is provided with a downwardly facing annular shoulder 128 engaging the upper surface of an annular flange 130 on the outer sleeve member 120. At its outer end the sleeve member 120 has an externally threaded portion indicated at 132 for receiving a cooperating valve cap (not shown) and has an internally threaded portion indicated at 134 in which is mounted a valve core 136.

A tubular member 138, corresponding to the tubular member 50, has a threaded engagement indicated at 140 adjacent its lower end with a housing 142 having an upwardly extending cylindrical portion 144 having a press fit in a cooperating recess in the lower end of the sleeve member 114. The housing 142 is provided with a recess 146 at its lower end in which is mounted a dust filtering material 148. Centrally of the recess 146 is an aperture 150 communicating with the lower end of the cylindrical bore 152 of the tubular member 138. The tubular member 138 projects upwardly into the bore 116 of the sleeve member 114 and is substantially smaller in diameter than the bore 116, with the exception of a cylindrical portion 154 adjacent its upper end which slidably fits the bore 116 and is provided with flats 156 (see Fig. 6) at opposite sides thereof permitting the passage of air through the bore 116 past the cylindrical portion 154.

A contact element 158 is mounted in the upper end of the tubular member 138 and closes the upper end of the bore 152. The contact element 158 is insulated from the tubular member 138 and is formed by drilling a bore 162 in its upper end downwardly to a point in spaced relation above its lower end. This bore is then filled with a suitable insulating and sealing material 164, such for example, as sealing wax and a smaller bore 160 is then drilled upwardly from the lower end of the element 158 in coaxial relation with the larger bore 162. The small bore 160 extends into the insulating material 164 in overlapping relation with the bore 162 as is clearly illustrated in Fig. 5. The contact element 158 is electrically connected to the outer sleeve element 120 by a coil spring 166.

A cylindrical piston 168 is mounted in the bore 152 and carries a spherical contact element 170 on an upwardly extending rod 172, the contact element 170 being adapted to slidably fit in the slot 160 extending inwardly of the lower end of the contact element 158.

It will now be appreciated that upon movement of the piston 168 upwardly from the position illustrated in Figure 5, the contact element 170 will be moved into the slot 160 and into contact with the contact element 158 and that upon continued upward movement of the piston 168, the contact element 170 will be moved into the bore 162 and out of engagement with the contact element 158. This embodiment of the invention is preferably calibrated with the piston 168 so positioned in the bore 152 that the contact element 170 will be in contact with the contact element 158 when the pressure within the tube 19 is within the desired pressure range.

While only a few specific embodiments of the invention have been illustrated and described in detail, it will be readily appreciated by those skilled in the art that numerous modifications and changes may be made without departing from the spirit of the present invention.

What is claimed is:

1. In a gas indicator apparatus for a normally closed chamber, means for controlling an electrical signal circuit, said means comprising means defining a cylinder closed at one end, said cylinder having an opening in spaced relation to said closed end and adapted to communicate with said chamber, piston means mounted in said cylinder intermediate said opening and said closed end, said piston means fitting said cylinder to prevent gas from flowing past said piston means and being freely movable along said cylinder in response to a balancing of the gas pressure in said cylinder at the opposite sides of said piston means, electrical conductor means adapted to form a part of said signal circuit, said piston means including an integral portion movable to engage said conductor means to close said signal circuit throughout a predetermined range of movement of said piston means relative to said cylinder.

2. In a gas indicator apparatus for a normally closed chamber, means for controlling an electrical signal circuit, said means comprising means defining a cylinder closed at one end, said cylinder having an opening in spaced relation to said closed end and adapted to communicate with said chamber, piston means mounted in said cylinder intermediate said opening and said closed end, said piston means fitting said cylinder to prevent gas from flowing past said piston means and being freely movable along said cylinder in response to a balancing of the gas pressure in said cylinder at the opposite sides of said piston means, a pair of electrical conductor means adapted to form a part of said signal circuit, said piston means including an integral portion movable to engage said conductor means to close said signal circuit throughout a predetermined range of movement of said piston means relative to said cylinder.

3. In a gas indicator apparatus for a normally closed chamber, means for controlling an electrical signal circuit, said means comprising means defining a cylinder closed at one end, said cylinder having an opening in spaced relation to said closed end and adapted to communicate with said chamber, piston means mounted in said cylinder intermediate said opening and said closed end, said piston means fitting said cylinder to prevent gas from flowing past said piston means and being freely movable along said cylinder in response to a balancing of the gas pressure in said cylinder at the opposite sides of said piston means, a pair of electrical conductor means adapted to form a part of said signal circuit, said piston means including an integral portion adapted to engage said conductor means to close said signal circuit throughout a predetermined range of movement of said piston means relative to said cylinder, one of said conductor means projecting into said cylinder and terminating in spaced relation to said closed end thereof.

4. In a gas indicator apparatus for a normally closed chamber, means for controlling an electrical signal circuit, said means comprising means defining a cylinder closed at one end, said cylinder having an opening in spaced relation to said closed end and adapted to communicate with said chamber, piston means mounted in said cylinder intermediate said opening and said closed end and freely movable therealong in response to a balancing of the gas pressure in said cylinder at the opposite sides of said piston means, electrical conductor means adapted to form a part of said signal circuit, said piston means including an integral portion adapted to engage said conductor means to close said signal circuit throughout a predetermined range of movement of said piston means relative to said cylinder, said piston means being adapted, upon movement of said piston means in either direction relative to said cylinder beyond said predetermined range of movement, to break the circuit through said conductor means.

5. In a gas indicator apparatus for a normally closed chamber, means for controlling an electrical signal circuit, said means comprising means defining a cylinder closed at one end, said cylinder having an opening in spaced relation to said closed end and adapted to communicate with said chamber, piston means mounted in said cylinder intermediate said opening and said closed end and freely movable therealong in response to a balancing of the gas pressure in said cylinder at the opposite sides of said piston means, a pair of electrical conductor means adapted to form a part of said signal circuit, said piston means including an integral portion adapted to engage said conductor means to close said signal circuit throughout a predetermined range of movement of said piston means relative to said cylinder, said piston means being adapted, upon movement of said piston means in either direction relative to said cylinder beyond said predetermined range of movement, to move out of electrical contact with one of said conductor means to break the circuit through said conductor means.

6. In an apparatus for indicating changes in the gas pressure within a normally closed chamber, means for controlling an electrical signal circuit, said means comprising means defining a cylinder closed at one end, said cylinder having an opening in spaced relation to said closed end and adapted to communicate with said chamber, piston means mounted in said cylinder intermediate said opening and said closed end and freely movable therealong in response to a balancing of the gas pressure in said cylinder at the opposite sides of said piston means, a pair of electrical conductor means adapted to form a part of said signal circuit, said piston means including an integral portion adapted to engage said conductor means to close said signal circuit throughout a predetermined range of movement of said piston means relative to said cylinder, said piston means being adapted, upon movement of said piston means in either direction relative to said cylinder beyond said predetermined range of movement, to move out of electrical contact with one of said conductor means to break the circuit through said conductor means, said first named means being so constructed and arranged that said piston means is disposed within said predetermined range of movement when the gas pressure in said cylinder at the side of said piston means adjacent said opening is within the desired pressure limits for said chamber.

7. An apparatus as defined in claim 1 wherein said electrical conductor means are interconnected by said piston means at all times when the gas pressure within said cylinder at the side of said piston means adjacent said opening is within the desired range of pressures in said chamber.

8. In a gas indicator apparatus for a normally closed chamber, a stem adapted to be mounted in communication with said chamber and including a sleeve member formed of a conductor of electricity, means mounted in said sleeve member and defining a cylinder closed at one end and having an opening in spaced relation to said closed end for communication with said chamber through said sleeve member, electrical conductor means projecting into said cylinder and insulated from said sleeve member, said conductor means terminating in spaced relation to said closed end, other electrical conductor means electrically connected to said sleeve member and projecting into said cylinder in spaced relation to said conductor means, piston means disposed in said cylinder freely movable in response to the gas pressures in said cylinder at the opposite sides of said piston means and adapted to engage said conductor means to electrically interconnect said conductor means throughout a predetermined range of movement of said piston means relative to said cylinder, a second sleeve member also formed of a conducting material and disposed in coaxial relation with said first sleeve member, means mounting said second sleeve member on said first sleeve member and insulating it therefrom, said first named electrical conductor means being connected to said second sleeve member.

9. In a gas indicator apparatus for a normally closed chamber, the combination of a tubular member formed of a material which is a non-conductor of electricity and having a bore extending longitudinally thereof and closed at one end, said tubular member having an opening disposed in spaced relation to said one end for connecting said bore with said chamber, a pair of electrical conductors projecting into said bore in spaced relation to said one end and intermediate said one end and said opening, said conductors terminating in spaced relation to one another longitudinally of said bore, piston means disposed in said bore formed of electrical conducting material and adapted to electrically interconnect said conductors throughout a predetermined range of movement of said piston means relative to said tubular member, said piston means being freely movable in response to the gas pressures in said bore at the opposite sides of said piston means.

10. In a gas indicator apparatus for a normally closed chamber, a stem adapted to be mounted in communication with said chamber and including a sleeve member formed of a conductor of electricity, a tubular member mounted in said sleeve member formed of a material which is a non-conductor of electricity and having a bore extending longitudinally thereof and closed at one end, said tubular member having an opening disposed in spaced relation to said one end for connecting said bore with said chamber, a pair of electrical conductors projecting into said bore in spaced relation to said one end and intermediate said one end and said opening, said conductors terminating in spaced relation to one another longitudinally of said bore, piston means disposed in said bore formed of electrical conducting material and adapted to electrically interconnect said conductors throughout a predetermined range of movement of said piston means relative to said tubular member, said piston means being freely movable in response to the gas pressures in said bore at the opposite sides of said piston means, a second sleeve member also formed of a conducting material and disposed in coaxial relation with said first sleeve member, means mounting said second sleeve member on said first sleeve member and insulating it therefrom, one of said electrical conductors being connected to said first sleeve member and the other of said electrical conductors being connected to the other of said sleeve members.

11. The combination of claim 10 wherein said first sleeve member has one end open and adapted to communicate with said chamber and the portion of said tubular member in which is said closed end of said bore being disposed remote from said one end of said sleeve member.

12. The combination of claim 10 wherein said sleeve member has one end open and adapted to communicate with said chamber and said tubular member is disposed with the portion thereof in which said closed end of said bore is formed disposed outwardly of said first sleeve member adjacent said one end thereof and adapted to project into said chamber.

13. An apparatus as defined in claim 1 wherein said means defining said cylinder is adapted to be disposed with said closed end of said cylinder out of substantial heat exchange relation with said chamber.

14. An apparatus as defined in claim 1 wherein said means defining said cylinder is adapted to be disposed with said closed end of said cylinder in substantial heat exchange relation with said chamber.

15. In a gas indicator apparatus for a normally closed chamber, a valve stem adapted to be mounted in communication with said chamber and including a sleeve member formed of a conductor of electricity, means mounted in said sleeve member and defining a cylinder closed at one end and having an opening in spaced relation to said closed end for communication with said chamber, a tubular member connected to said opening and extending through said sleeve member, electrical conductor means projecting into said cylinder and terminating in spaced relation to said closed end, other electrical conductor means electrically connected to said sleeve member, piston means disposed in said cylinder freely movable in response to the gas pressures in said cylinder at the opposite sides of said piston means and adapted to engage said conductor means to electrically interconnect said conductor means throughout a predetermined range of movement of said piston means relative to said cylinder, a second sleeve member also formed of a conducting material and disposed in coaxial relation with said first sleeve member, means mounting said second sleeve member on said first sleeve member and insulating it therefrom, and a valve mounted in said second sleeve member for controlling the flow of gas therethrough, said first named electrical conductor means being connected to said second sleeve member, said first sleeve member having one end open and adapted to communicate with said chamber and said tubular member including a portion extending out of said first sleeve member through said one end and adapted to terminate in said chamber.

16. In a gas indicator apparatus for a normally closed chamber, a stem adapted to be mounted in communication with said chamber and including a sleeve member formed of a conductor of electricity, a tubular member formed of a conductor of electricity and defining a cylinder closed at one end, said tubular member having an opening spaced from said one end for establishing communication between said cylinder and said chamber, a contact element mounted on said tubular member and projecting into said cylinder and terminating adjacent said closed end thereof, a piston formed of a conductor of electricity and mounted in said cylinder between said closed end and said opening, said piston being movable in said cylinder in response to the pressures at the opposite sides of said piston, another contact element mounted on said piston and adapted to make contact with said first named contact element throughout a predetermined range of movement of said piston relative to said cylinder.

17. In a gas indicator apparatus for a normally closed chamber, a stem adapted to be mounted in communication with said chamber and including a sleeve member formed of a conductor of electricity and having one end open and adapted to communicate with said chamber, a tubular member formed of a nonconductor of electricity and defining an elongated cylinder closed at one end and having a very small diameter, said tubular member being mounted in said sleeve member and having an opening in spaced relation to said one end for communication with said chamber, a body of electrically conductive liquid material in said tubular member intermediate said one end and said opening and freely movable within said cylinder in response to the fluid pressures at the opposite ends of said body of liquid material, a second sleeve member formed of electrically conductive material and insulated from said first named sleeve member, first conductor means connected to said first named sleeve member and second conductor means connected to said second sleeve member, said conductor means extending through the wall of said tubular member and spaced longitudinally thereof relative to each other and adapted to be engaged by said body of said liquid material, and said body of liquid material being adapted to engage and electrically interconnect said conductor means throughout a predetermined range of movement of said body of liquid material relative to said tubular member.

18. A valve stem unit for an air indicator apparatus for an automobile tire or tire tube having a valve stem including a sleeve member formed of electrically conductive material and having one end open and adapted to communicate with the interior of said tire or tire tube, said valve stem unit comprising a tubular member formed of a nonconductor of electricity and defining an elongated cylinder closed at one end, said tubular member being mounted in said sleeve member and having an opening in spaced relation to said one end for communication with said tire or tube, a body of electrically conductive liquid material in said tubular member intermediate said one end and said opening and freely movable within said cylinder in response to the fluid pressures at the opposite ends of said body of liquid material, a second sleeve member formed of electrically conductive material, means for insulating said second sleeve member from said first sleeve member, first conductor means adapted to be electrically connected to said first named sleeve member and second conductor means connected to said second sleeve member, said conductor means extending through the wall of said tubular member and spaced longitudinally thereof relative to each other and adapted to be engaged by said body of said liquid material, said body of liquid material being adapted to engage and electrically interconnect said conductor means throughout a predetermined range of movement of said body of liquid material relative to said tubular member.

19. In a gas indicator apparatus for a normally closed chamber, a stem adapted to be mounted in communication with said chamber and including a sleeve member formed of a conductor of electricity, a tubular member mounted in said sleeve member formed of a material which is a nonconductor of electricity and having a bore extending longitudinally thereof and closed at one end, said tubular member having an opening disposed in spaced relation to said one end for connecting said bore with said chamber, a pair of electrical conductors projecting into said bore in spaced relation to said one end and intermediate said one end and said opening, said conductors terminating in spaced relation to one another longitudinally of said bore, piston means disposed in said bore formed of electrical conducting material and adapted to electrically interconnect said conductors throughout a predetermined range of movement of said piston means relative to said tubular member, said piston means being freely movable in response to the gas pressures in said bore at the opposite sides of said piston means, a second sleeve member also formed of a conducting material and disposed in coaxial relation with said first sleeve member, means mounting said second sleeve member on said first sleeve member and insulating it therefrom, one of said electrical conductors being connected to said first sleeve member and the other of said electrical conductors being connected to the other of said sleeve members, said first sleeve member having one end open and adapted to communicate with said chamber and said portion of said tubular member in which is said closed end of said bore being disposed remote from said one end of said sleeve member.

JERÉ K. JACOBUS.

References Cited in the file of this patent

UNITED STATES PATENTS

| Number | Name | Date |
|---|---|---|
| 939,986 | Dalen | Nov. 16, 1909 |
| 1,202,577 | Peschman | Oct. 24, 1916 |
| 1,593,222 | Russell | July 20, 1926 |
| 1,774,801 | Macke | Sept. 2, 1930 |
| 1,777,213 | Magill | Sept. 30, 1930 |
| 2,069,154 | Kruse | Jan. 26, 1937 |
| 2,113,957 | Androsky | Apr. 12, 1938 |
| 2,297,917 | Schmidt | Oct. 6, 1942 |
| 2,327,054 | Mays | Aug. 17, 1943 |